May 23, 1939.    C. J. WEIBLE    2,159,413

TELEMETRIC SYSTEM

Filed May 28, 1937    2 Sheets-Sheet 1

INVENTOR
CARL J. WEIBLE
BY
Raymond W. Junkins
ATTORNEY

May 23, 1939.　　　　C. J. WEIBLE　　　　2,159,413
TELEMETRIC SYSTEM
Filed May 28, 1937　　　2 Sheets-Sheet 2

INVENTOR
CARL J. WEIBLE
BY
Raymond D. Junkins
ATTORNEY

Patented May 23, 1939

2,159,413

UNITED STATES PATENT OFFICE 2,159,413

TELEMETRIC SYSTEM

Carl J. Weible, Cleveland, Ohio, assignor to Bailey Meter Company, a Delaware corporation Application May 28, 1937, Serial No. 145,278

14 Claims. (Cl. 177—351)

This invention relates to telemetric systems for remotely indicating or otherwise exhibiting the position of a movable transmitting member, and more particularly to telemetric systems wherein the position of a movable transmitting member is exhibited at a plurality of remote receiving stations.

One object of my invention is to provide a system for telemetering from a single transmitting station to a plurality of receiving stations wherein the receiving stations are arranged in cascade, so that a minimum of connecting wires is required between stations, and it is not necessary for the transmitter to supply energy for all of the receivers.

A further object is to provide such a telemetric system wherein the operation of all receivers is maintained in proper correspondence by simple phasing means.

Further objects will be apparent from the description to follow and from the drawings, in which.

Figure 1:
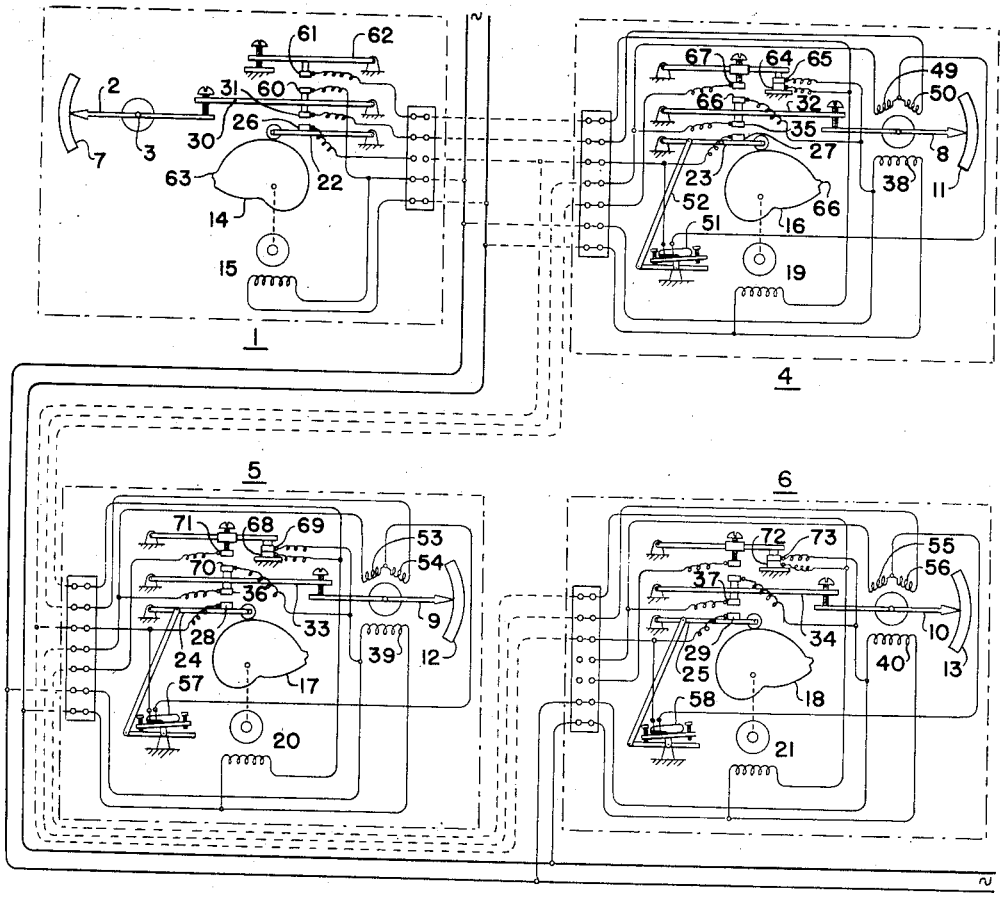
Fig. 1 is a diagrammatic representation of one embodiment of my invention.

Referring to Fig. 1, I therein show a transmitting station generally indicated at 1, within which is a movable transmitting member 2, the angular position of which about a pivot 3 it is desired to indicate or otherwise exhibit at a plurality of remote receiving stations generally indicated at 4, 5 and 6. The member 2, for example, may be responsive to and positioned by and in accordance with the rate of flow of a fluid, the pressure or temperature of a body, a liquid level, an electromotive force, or other variable, the magnitude of which it is desired to exhibit at remote points; or it may be manually positioned to transmit orders, commands or information to remote points. Cooperating with the movable member 2 is an index 7 which may be graduated in desired units so that the position of the movable member 2 will exhibit directly the magnitude of the variable being measured.

Within the remote receiving stations 4, 5 and 6 are movable members 8, 9 and 10 having cooperating indices 11, 12 and 13 respectively. Through the agency of mechanisms hereinafter to be described the angular positions of members 8, 9 and 10 are maintained in correspondence with the angular position of the movable member 2, so that an observer located at any one of the receiving stations 4, 5 or 6 will immediately be advised of the position of the movable member 2. Generally speaking it may be said that such correspondence between the transmitting and receiving members is obtained through arranging the receiving members in series or in cascade and periodically correcting the position of the first receiving member in the series to bring it into agreement with that of the transmitting member, periodically correcting the position of the second receiving member in the series to bring it into agreement with the position of the first receiving member, and continuing such operation, that is periodically correcting the position of each receiving member to bring it into agreement with the position of the preceding receiving member in the series, to the end of the series. Specifically referring to Fig. 1, the position of the receiving member 8 is periodically corrected to bring it into agreement with the position of the transmitting member 2, the position of the receiving member 9 is periodically corrected to bring it into agreement with that of the receiving member 8, and the position of the receiving member 10 is periodically corrected to bring it into agreement with that of the receiving member 9. While in Fig. 1 but three receiving stations have been illustrated, it will be obvious that in accordance with my invention any number of receiving stations so arranged in series may be actuated from a single transmitting member.

Within the transmitting station 1 is a substantially uniform rise cam 14 rotated at constant speed by a motor 15. Within the receiving stations 4, 5 and 6 are similarly shaped cams 16, 17 and 18 rotated by motors 19, 20 and 21 respectively. Periodically reciprocated by cams 14, 16, 17 and 18 are pivoted members 22, 23, 24 and 25 carrying contacts 26, 27, 28 and 29 respectively.

Positioned by and in accordance with the transmitting member 2 is a pivoted member 30 carrying a contact 31 arranged to be engaged by the contact 26. Within the receiving stations 4, 5 and 6 are similar pivoted members 32, 33 and 34 carrying contacts 35, 36, 37 and positioned by and in accordance with the associated receiving members 8, 9 and 10 respectively.

The cams 14, 16, 17 and 18 are rotated at identical speeds and in exact phase, so that at any instant the point on the contour of cam 14 engaged by the member 22 is the same as that engaged by members 23, 24 and 25 on cams 16, 17 and 18. Accordingly if the position of the receiving member 8 is in agreement with that of the transmitting member 2 the contact 27 will engage the contact 35 at the same instant as the contact 26 engages the contact 31. Likewise due to the series arrangement of the receivers 4, 5 and 6, if the member 9 is in correct correspondence with the member 8 then contacts 28, 36 will engage at the same instant as do contacts 27, 35, and if the movable member 10 is in proper correspondence with the member 9 then contacts 29, 37 will engage at the same instant as do contacts 28, 36. If, however, there is a change in the position of member 2, then the instant at which the contact 26 engages the contact 31 will lead or lag the instant at which the contacts 27, 35 engage by an amount proportional to the change in position of the member 2 and depending upon the sense of the change in position. The position of the movable receiving member 8 will then be corrected by an amount proportional to the change in the position of the transmitting member 2 and will accordingly be restored to proper correspondence therewith. Thereafter the movable member 9 will be brought into proper correspondence with the member 8 and the member 10 in proper correspondence with the member 9 in the order stated.

Figure 2:
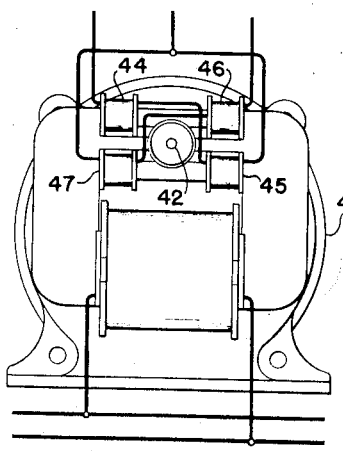
Fig. 2 is a front elevation of a reversing motor used in the embodiment of my invention shown in Fig. 1.
Figure 3:
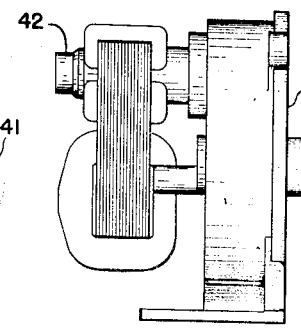
Fig. 3 is a side elevation of the reversing motor.
Figure 4:
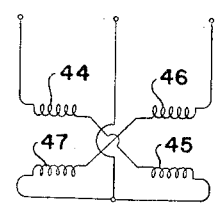
Fig. 4 is a diagram of the shading pole windings and connections of the motor shown in Figs. 2 and 3.

In Fig. 1 the members 8, 9 and 10 are diagrammatically shown as being positioned by reversible motors 38, 39 and 40 respectively. These motors have opposed wound shading poles and a continuously excited field. As shown in Figs. 2 and 3, the motors are provided with an integral speed reduction unit 41, so that several revolutions of the armature 42 are required to position the drive shaft 43 through a relatively small angle. As shown in Figs. 2 and 4, the opposed poles are split into two parts 44, 45 and 46, 47. Rotation of the motor in one direction is accomplished by short circuiting the windings 44 and 45. Rotation in the opposite direction is accomplished by short circuiting the windings 46 and 47. With windings 44, 45 and 46, 47 open circuited, or simultaneously short circuited, the motor remains stationary and is not urged to rotation in either direction.

In Fig. 1 the opposed wound shading poles of the motor 38 are shown diagrammatically at 49 and 50. The shading pole 50 is energized upon closure of the contacts 26, 31 whereas the shading pole 49 is energized upon closure of the contacts 27, 35. When contacts 26, 31 and 27, 35 engage at the same instant, both poles 49 and 50 are energized and the movable member 8 remains stationary. If contacts 26, 31 engage before contacts 27, 35, then the member 8 will be positioned in one direction. If contacts 27, 35 engage before contacts 26, 31 then the member 8 will be positioned in the opposite direction. Such positioning will continue until the lagging pair of contacts engage, when the member 8 will be brought to a substantially instantaneous stop and remain stationary until the next revolution of cams 14 and 16, when it will again be positioned if not in proper correspondence with the position of the movable member 2.

To provide for simultaneous deenergization of poles 49 and 50, connected in the neutral is a mercury switch 51 positioned through link 52 by member 23. At a predetermined point in the travel of member 23 the switch 51 is thrown, opening the circuit through poles 49 and 50. Upon return of member 23 to a second predetermined position the switch 51 is thrown in opposite direction so that the poles 49 and 50 may be energized through engagement of contacts 26, 31 and/or 27, 35. The switch 51 is preferably arranged to close before contacts 26, 31 or 27, 35 can engage regardless of the positions of members 2 or 8, and likewise to open circuit after contacts 26, 31 or 27, 35 have engaged regardless of the position of movable member 2 or 8. In other words, energization of the poles 49 and 50 is controlled by contacts 26, 31 and 27, 35 respectively, whereas deenergization is controlled by the switch 51.

The motors 39 and 40 have opposed wound shading poles diagrammatically illustrated at 53, 54 and 55, 56 respectively. The pole 54 is energized upon closure of contacts 27, 35, whereas the pole 53 is energized upon closure of contacts 28, 36. Similarly the pole 56 is energized upon closure of contacts 28, 36 and the pole 55 upon closure of contacts 29, 37. Accordingly, it is apparent that periodically, once every revolution of the cams 14, 16, 17 and 18 the position of the movable member 8 is compared with that of the movable member 2, that of the movable member 9 with that of the movable member 8, and that of the movable member 10 with that of the movable member 9, and if upon such comparison they are not found in proper correspondence then the motors 38, 39 and 40 are operated in one direction or another to bring them into such correspondence.

Connected in the neutral of the opposed wound shading poles of motor 39 is a mercury switch 57 and in the neutral of motor 40 a similar switch 58. As hereinbefore explained with reference to motor 38, switches 57 and 58 are arranged to close and open circuit at predetermined points in the travel of members 24 and 25 respectively.

Due to changes in relative friction between motors 15, 19, 20 or 21, or upon these motors being energized after a power failure cams 14, 16, 17 and/or 18 may depart from proper phase relationship. In order that they be restored to proper phase relationship I provide means whereby the angular position of the cam 16 is periodically compared with the position of cam 14 and if not in agreement the motor 19 is momentarily periodically stopped until proper agreement is restored. Correspondingly, the position of the cam 17 is periodically compared with that of the cam 16 and corrected if found necessary, and the position of the cam 18 compared with that of the cam 17, and likewise corrected if found necessary.

Carried by the member 30 is a contact 60 arranged to engage a contact 61 carried by a pivoted member 62 when the member 22 engages a projection 63 on cam 14. Contacts 60, 61 are connected in circuit with motor 19 and upon closure will energize it. Also connected in circuit with motor 19 and in parallel with contacts 60, 61 are normally closed contacts 64, 65. Likewise, when engaged, serving to energize motor 19. Contacts 64, 65 are disengaged when member 23 engages a projection 66 on cam 16. In normal operation the motor 19 is energized through contacts 64, 65 except when member 23 engages projection 66. If cams 14 and 16 are in proper phase relationship at the instant when contacts 64, 65 are disengaged, contacts 60, 61 are engaged, thereby establishing continuous energization of the motor 19. However, if cam 16 is displaced from proper phase relationship with respect to cam 14, such simultaneous and instantaneous action between contacts 60, 61 and 64, 65 will not occur, thereby effecting deenergization of motor 19, causing the cam 16 to remain stationary until proper phase relationship is restored. Such is the action when the cam 14 leads the cam 16. However, when the cam 14 lags the cam 16 the motor 19 will be periodically stopped once each revolution for a small increment of time until proper phase relationship is restored.

The motor 20 is controlled in similar fashion through contacts 66, 67 and 68, 69. In this instance the position of the cam 17 is compared to the position of the cam 16 and if found different is periodically adjusted to maintain proper phase relationship. Contacts 70, 71 and 72, 73 likewise control actuation of motor 21 to maintain cam 18 in proper phase relationship with respect to cam 17.

Figure 5:
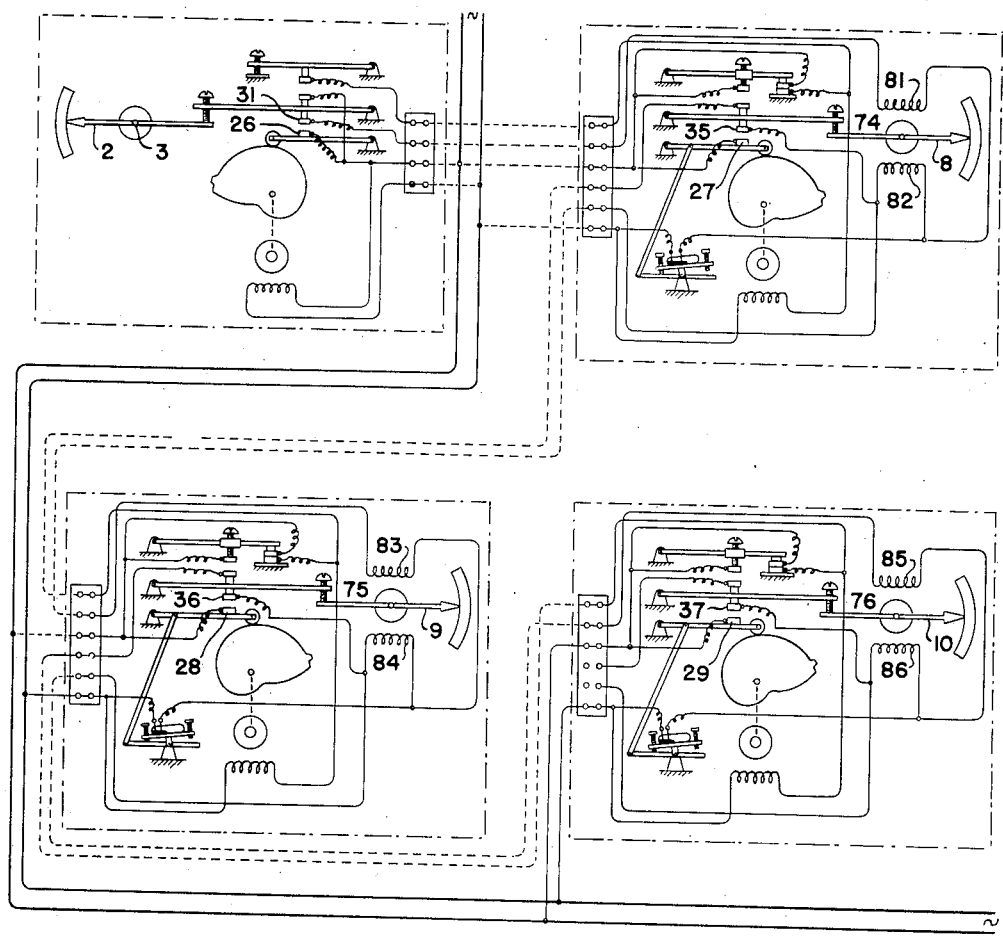
Fig. 5 is a diagrammatic illustration of a further embodiment of my invention.
Figure 6:
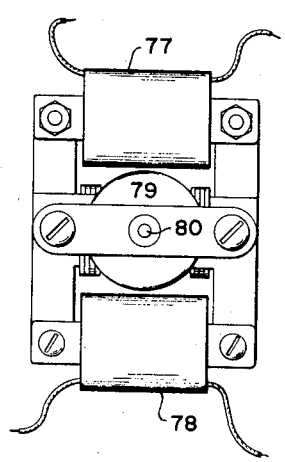
Fig. 6 is a front elevation of the motor preferably used in the embodiment of my invention shown in Fig. 5.
Figure 7:
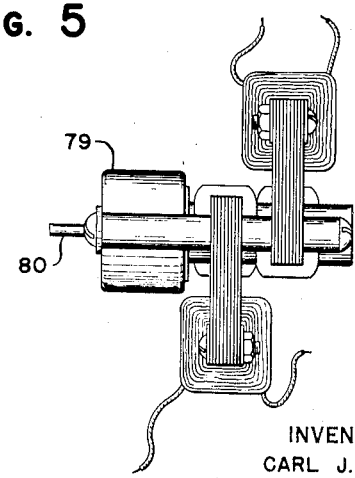
Fig. 7 is a side elevation of the motor shown in Fig. 6.

In Fig. 5 I have shown a further embodiment of my invention wherein the movable members 8, 9 and 10 are positioned by reversible self-starting synchronous motors having opposed fields. As shown, the members 8, 9 and 10 are positioned by motors 74, 75 and 76 respectively, shown in greater detail in Figs. 6 and 7. The motor has opposed fields 77 and 78. When the field 77 is energized the motor rotates in one direction and when the field 78 is energized the motor rotates in opposite direction. With both fields energized or deenergized the motor is not urged to rotation in either direction. The motor contains an integral gear reduction 79 so that the positioning shaft 80 rotates through a small angle for several revolutions of the motor armature. The fields 77, 78 are arranged to be connected across a suitable source of potential and energization is not established through short circuiting of the windings as is the case with the motor shown in Figs. 2, 3.

The motor 74 positioning the member 8 is provided with fields 81 and 82, the former being controlled by contacts 26, 31 and the latter by contacts 27, 35. Similarly the motor 75 is provided with fields 83, 84 and the motor 76 with fields 85, 86. The field 83 is controlled by contacts 27, 35 and the field 84 by contacts 28, 36. The field 85 is controlled by contacts 28, 36 and the field 86 by contacts 29, 37. It is apparent therefore that the principal of operation of the modification of my invention shown in Fig. 5 is substantially the same as that shown in Fig. 1. In the former the contacts serving to short circuit the opposed pole windings of a reversible motor, in the latter serving to energize the fields of a self-starting reversible synchronous motor.

While I have illustrated and described certain specific embodiments of my invention, it is to be understood that I am not to be limited thereby.

What I claim as new, and desire to secure by Letters Patent of the United States, is:

1. In a telemetric system for positioning a plurality of remote indicators in accordance with the positioning of a transmitting member, in combination, a movable transmitting member, a plurality of movable receiving members, a separate reversible motor having opposed windings for positioning each of said receiving members, means under the control of said movable transmitting member for energizing a winding of one of said reversible motors, means under the control of the associated receiving member for energizing the opposed winding of said one of said reversible motors and a winding of another of said reversible motors, and means under the control of the receiving member associated with said last named motor for energizing the opposed winding.

2. In a telemetric system for positioning a plurality of remote indicators in accordance with the positioning of a transmitting member, in combination, a movable transmitting member, a plurality of movable receiving members, a separate reversible motor having opposed wound shading poles for positioning each of said receiving members, means under the control of said movable transmitting member for energizing a winding of one of said reversible motors, means under the control of the associated member for energizing the opposed winding of said one of said reversible motors and a winding of another of said reversible motors, and means under the control of the receiving member associated with said last named motor for regulating the energization of the opposed winding.

3. In a telemetric system for positioning a plurality of remote indicators in accordance with the positioning of a transmitting member, in combination, a movable transmitting member, a plurality of movable receiving members, a separate reversible motor having opposed fields for positioning each of said receiving members, means under the control of said movable transmitting member for energizing a field of one of said reversible motors, means under the control of the associated receiving member for energizing the opposed field of said one of said reversible motors and a field of another of said reversible motors, and means under the control of the receiving member associated with said last named motor for regulating the energization of the opposed field.

4. In a telemetric system for maintaining angular agreement between the positions of a plurality of remote receiving members and the angular position of a transmitting member, in combination, a transmitting member angularly displaceable from an initial position, a plurality of receiving members each angularly displaceable from a corresponding initial position, means for periodically positioning one of said receiving members proportional to the difference between the angular position of said transmitting member and said receiving member, and means for periodically positioning another of said receiving members proportional to the difference between the angular position of said first named receiving member and said last named receiving member.

5. In a telemetric system for positioning a plurality of remote indicators in accordance with the positioning of a transmitting member, in combination, a movable transmitting member, a plurality of movable receiving members, a separate reversible motor having opposed windings for positioning each of said receiving members, cyclically operable means controlled by said transmitting member for periodically energizing a winding of one of said reversible motors, cyclically operable means controlled by the associated receiving member for periodically energizing the opposed winding of said one of said reversible motors and a winding of another of said reversible motors, and cyclically operable means controlled by the receiving member associated with said last named motor for periodically energizing the opposed winding of said last named reversible motor.

6. In a telemetric system for positioning a plurality of remote indicators in accordance with the positioning of a transmitting member, in combination, a transmitting station and a plurality of receiving stations, a continuously rotating cam and motor for rotating each cam located at said transmitting station and each of said receiving stations and means for maintaining said cams in predetermined phase relationship comprising, means for energizing one of said receiving motors for a predetermined portion of each revolution under the control of the cam driven by said receiving motor, means for energizing said receiving motor for the remainder of each revolution under the control of said transmitting cam, means for energizing a second receiving motor for a predetermined portion of each revolution of its driven cam and means for energizing said second receiving motor for the remainder of each revolution under the control of said first receiving motor.

7. In a telemetric system for positioning a series of remote indicators in accordance with the positioning of a transmitting member, in combination, a series of remote indicators, a separate reversible motor having opposed windings for actuating each of said remote indicators, means under the control of said transmitting member for energizing a winding of the reversible motor actuating the first of said series of indicators and means under the control of each of said remote indicators for controlling the energizing of a winding of its associated reversible motor and a winding of the reversible motor associated with the succeeding remote indicators in said series.

8. In a telemetric system for positioning a series of remote indicators in accordance with the positioning of a transmitting member, in combination, a series of remote indicators, a separate reversible motor having opposed windings for actuating each of said remote indicators, cyclically operable means associated with each of said remote indicators, means under the joint control of said transmitting member and the associated cyclically operable means for periodically energizing a winding of the reversible motor driving the first of said series of remote indicators, and means under the joint control of each of said remote indicators and the cyclically operable means associated therewith for periodically energizing a winding of its driving reversible motor and a winding of the reversible motor associated with the succeeding remote indicator in said series.

9. In a telemetric system for positioning a series of remote indicators in accordance with the positioning of a transmitting member, in combination, a transmitting member and a plurality of receiving members, a separate reversible motor having opposed windings for actuating each of said receiving members, a continuously rotating cam associated with each of said receiving members and said transmitting member, all of said cams having identical contours, means for driving said cams in predetermined phase relationship, contact means under the joint control of said transmitting cam and the transmitting member for energizing a winding of the reversible motor positioning the first of said series of receiving members, a contact means under the joint control of each of said receiving members and the associated cam for energizing a winding of the reversible motor associated therewith and a winding of the reversible motor associated with the succeeding receiving member, whereby each of said receiving members is periodically positioned for a time length proportional to the difference in time the opposed windings of the associated reversible motor are energized.

10. In a telemetric system, transmitting means for cyclically telemetering signals of a time duration corresponding to a variable, a first receiver means, a movable member in said first receiver means, means including means responsive to said signals for causing said member to assume a position corresponding to the time duration of said signals, means for cyclically telemetering signals of a time duration corresponding to the position of said movable member, a second receiver means, a second movable member in said second receiver means, and means including means responsive to said last named signals for causing said second member to assume a position corresponding to the time duration of said last named signals.

11. In a telemetric system for maintaining correspondence of position between a plurality of remote receiver members and a transmitting member, in combination, a movable transmitting member, a plurality of movable receiving members, a separate reversible motor having opposed windings for positioning each of said receiving members, means under the control of said transmitting member for cyclically energizing a winding of one of said reversible motors for a time duration corresponding to the position of said transmitting member, means under the control of the movable receiving member associated with said one of said reversible motors for cyclically energizing the opposed winding of said one of said reversible motors and a winding of another of said reversible motors for a time duration corresponding to the position of said associated member, and means under the control of the movable member associated with said last named member for cyclically energizing the opposed winding of said last named motor for a time duration corresponding to the position of said last named member.

12. In a telemetric system for maintaining correspondence of position between a plurality of remote receiving members and a transmitting member, in combination, a movable transmitting member, a plurality of movable receiving members, means for periodically originating signals of a time duration corresponding to the position of said transmitting member, means including means responsive to said signals for moving one of said receiving members to maintain the position assumed thereby in predetermined ratio to the duration of said signals, means for cyclically originating signals of a time duration corresponding to the position of said one of said receiving members, and means including means responsive to said last named signals for moving another of said receiving members to maintain the position assumed thereby in predetermined ratio to the duration of said last named signals.

13. In a telemetric system for maintaining agreement between the positions of a plurality of remote receiving members and the position of a transmitting member which is positioned between limits in correspondence with changes in the magnitude of a variable, in combination, a transmitting member displaceable toward and away from an initial position in correspondence to decreases and increases in the magnitude of a variable, a plurality of receiving members each displaceable toward and away from a corresponding initial position, means for periodically positioning one of said receiving members proportional to the difference between the position of said transmitting member and said receiving member in a direction to restore correspondence of position between said members, and means for periodically positioning another of said receiving members proportional to the difference between the position of said first named receiving member and said last named receiving member and in a direction to restore correspondence of position therebetween.

14. In a telemetric system for maintaining agreement between the positions of a plurality of remote receiving members and the position of a transmitting member which is positioned between limits in correspondence with changes in the magnitude of a variable, in combination, a transmitting member displaceable toward and away from an initial position in correspondence to decreases and increases in the magnitude of a variable, a plurality of receiving members each displaceable toward and away from a corresponding initial position, means including means responsive to the position of said transmitting member for positioning one of said receiving members toward and away from its initial position to maintain the position thereof in correspondence with the position of the transmitting member, and means including means responsive to the position of said first named receiving member for positioning another of said receiving members toward and away from its initial position to maintain the position thereof in correspondence with the position of said first named receiving member.

CARL J. WEIBLE.